US008707631B2

(12) United States Patent
Scouten

(10) Patent No.: US 8,707,631 B2
(45) Date of Patent: Apr. 29, 2014

(54) PORTABLE HOUSING SYSTEM

(76) Inventor: Alan Scouten, Charlottesville, VA (US)

( * ) Notice: Subject to any disclaimer, the term of this patent is extended or adjusted under 35 U.S.C. 154(b) by 0 days.

(21) Appl. No.: 13/350,198

(22) Filed: Jan. 13, 2012

(65) Prior Publication Data

US 2012/0180404 A1 Jul. 19, 2012

Related U.S. Application Data

(60) Provisional application No. 61/432,392, filed on Jan. 13, 2011.

(51) Int. Cl.
*E04B 1/346* (2006.01)

(52) U.S. Cl.
USPC ............ 52/66; 52/68; 52/69; 52/71; 52/220.2

(58) Field of Classification Search
USPC .............. 52/66, 68, 69, 745.2, 70, 71, 220.2, 52/220.7; 16/254, 260, 261, 265, 267, 16/270, 271, 272, 386, 387
See application file for complete search history.

(56) References Cited

U.S. PATENT DOCUMENTS

| | | | | | |
|---|---|---|---|---|---|
| 1,198,524 | A | * | 9/1916 | Cunliffe | 220/6 |
| 2,712,677 | A | * | 7/1955 | Hyde | 52/66 |
| 3,398,850 | A | * | 8/1968 | Kennard | 220/6 |
| 3,460,297 | A | * | 8/1969 | Fritz | 52/66 |
| 3,849,952 | A | * | 11/1974 | Hanaoka | 52/79.5 |
| 4,035,966 | A | * | 7/1977 | Dompas | 52/73 |
| 4,144,686 | A | * | 3/1979 | Gold | 52/223.12 |
| 4,166,343 | A | * | 9/1979 | O'Brian et al. | 52/66 |
| 4,275,537 | A | * | 6/1981 | Pinson | 52/223.8 |
| 4,373,304 | A | * | 2/1983 | Howitt | 52/73 |
| 4,425,741 | A | * | 1/1984 | Ronai | 52/70 |
| 4,467,572 | A | * | 8/1984 | Somers et al. | 52/70 |
| 4,546,583 | A | * | 10/1985 | Hussar | 52/236.1 |
| 4,603,658 | A | * | 8/1986 | Garnsey | 119/499 |
| 4,616,452 | A | * | 10/1986 | Lemerre | 52/71 |
| 4,633,626 | A | * | 1/1987 | Freeman et al. | 52/71 |
| 4,684,034 | A | * | 8/1987 | Ono et al. | 220/6 |
| 4,696,132 | A | * | 9/1987 | LeBlanc | 52/69 |
| 4,742,653 | A | * | 5/1988 | Napier et al. | 52/66 |
| 4,880,210 | A | * | 11/1989 | Cucksey | 256/26 |
| 4,891,919 | A | * | 1/1990 | Palibroda | 52/79.5 |
| 5,107,639 | A | * | 4/1992 | Morin et al. | 52/71 |
| 5,253,763 | A | * | 10/1993 | Kirkley et al. | 206/600 |
| 5,444,944 | A | * | 8/1995 | Roelofsz | 52/64 |
| 5,493,818 | A | * | 2/1996 | Wilson | 52/71 |
| 5,596,844 | A | * | 1/1997 | Kalinowski | 52/79.5 |
| 5,765,316 | A | * | 6/1998 | Kavarsky | 52/67 |
| 5,890,341 | A | * | 4/1999 | Bridges et al. | 52/745.2 |

(Continued)

*Primary Examiner* — Brian Glessner
*Assistant Examiner* — Joshua Ihezie
(74) *Attorney, Agent, or Firm* — McGuireWoods, LLP

(57) ABSTRACT

A modular housing system, also known as "Maisons Demontables" may utilize a plurality of lightweight composite construction panels to create modular housing units that have high degrees of resistance to environmental factors like wind, hurricanes, floods and so forth. The housing units may have a very high thermal insulating rating. The panels may comprise expanded polystyrene (EPS) panels to create a bent which is a plurality of panels that are hinged to one another so that they can be compressed for shipping, and expanded or unfolded to be used as part of a housing unit. The panels may be mated together to form a section of a housing unit such as a wall. The housing unit may be easily assembled or disassembled using basic tools. A hinge technique is provided for joining the panels together to form the bents, and may include a tensioning system to bind multiple panels together.

31 Claims, 8 Drawing Sheets

(56) References Cited

U.S. PATENT DOCUMENTS

| | | | |
|---|---|---|---|
| 5,920,936 A * | 7/1999 | Wiedeck et al. ................. 14/14 |
| 6,076,316 A * | 6/2000 | Cormann ..................... 52/220.1 |
| 6,164,476 A * | 12/2000 | Rene et al. ................... 220/4.31 |
| 6,253,498 B1 * | 7/2001 | Fanucci ............................ 52/69 |
| 6,350,308 B1 | 2/2002 | Dickens |
| 6,726,046 B2 * | 4/2004 | Orset ................................ 220/7 |
| 6,968,653 B2 * | 11/2005 | Stapleton et al. .............. 52/79.1 |
| 6,983,567 B2 * | 1/2006 | Ciotti ............................ 52/79.5 |
| 6,988,505 B2 * | 1/2006 | Powell et al. .................. 135/128 |
| 7,296,704 B2 * | 11/2007 | Ferrini ............................ 220/1.5 |
| 7,431,172 B1 * | 10/2008 | Spindel et al. ..................... 220/6 |
| 7,510,097 B2 * | 3/2009 | Spindel et al. ..................... 220/6 |
| 7,549,255 B2 * | 6/2009 | Kirkwood .......................... 52/69 |
| 8,011,523 B2 * | 9/2011 | Kochanowski ................ 220/1.5 |
| 2005/0077292 A1 * | 4/2005 | Devine ............................... 220/6 |
| 2007/0245637 A1 * | 10/2007 | Czyznikiewicz ................. 52/71 |
| 2008/0282623 A1 * | 11/2008 | Powell ............................... 52/71 |
| 2010/0154331 A1 | 6/2010 | Dickens |

\* cited by examiner

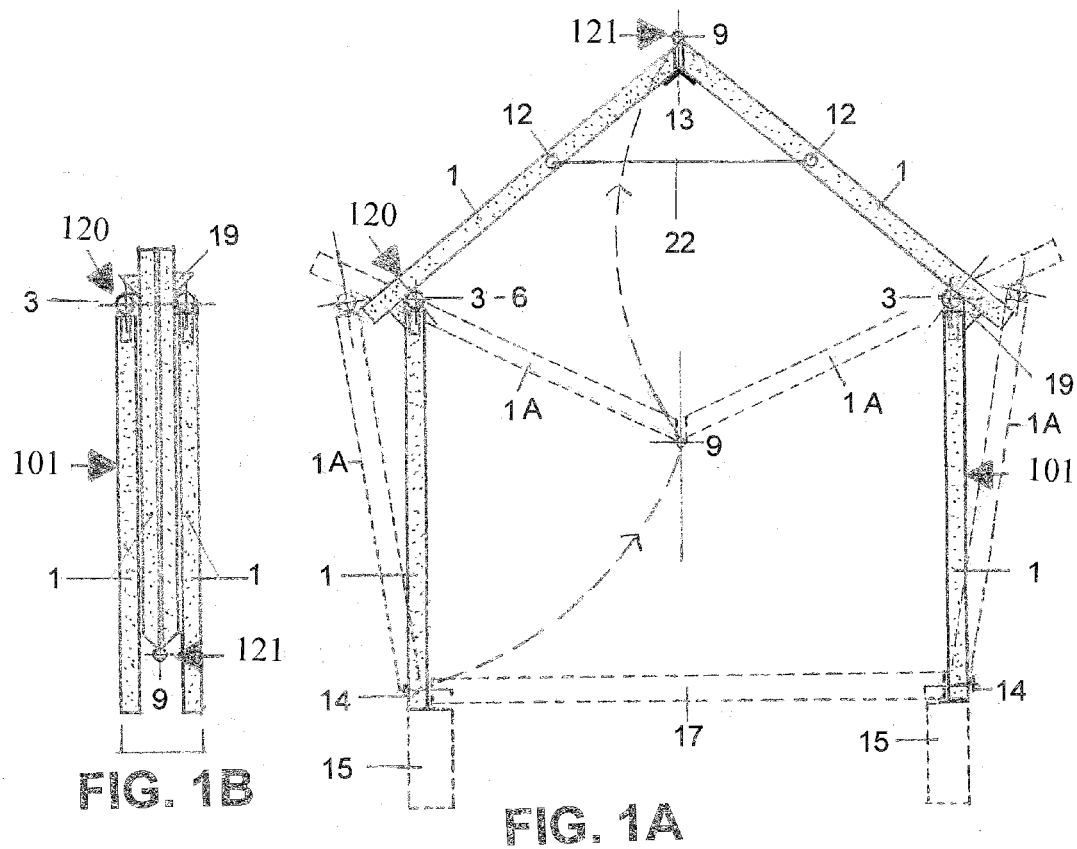
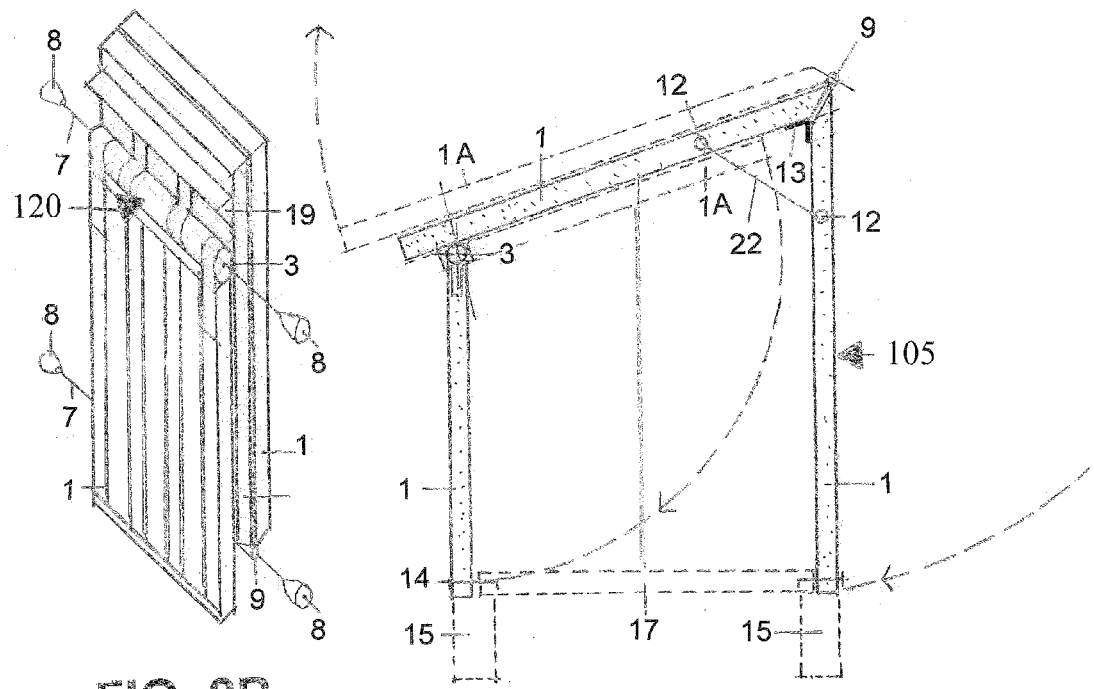

PORTABLE HOUSING SYSTEM

CROSS REFERENCE TO RELATED APPLICATIONS

This application claims benefit and priority to U.S. Provisional Application No. 61/432,392 filed Jan. 13, 2011, the disclosure of which is incorporated by reference herein in its entirety.

BACKGROUND

1.0 Field of the Invention

This invention is directed generally to portable or easily erected housing and, more particularly, the invention includes a system and a method related to portable housing that may be easily erected and of relatively low cost, and in certain aspects may provide high thermal efficiencies.

2.0 Related Art

There have been many variations of modular housing over the years, but most have proven economically infeasible or unnecessarily difficult to assemble by untrained personnel. Most panelized modular systems link components without creating a composite unit with the same characteristics of the individual pieces, i.e., a true monocoque shell with all stresses distributed by the composite nature of the structure. Traditional steel or wood stud construction must utilize separate tie-down rods and clips or other restraints to achieve a continuous load-path, meeting hurricane resistance requirements, for example. By nature of their winged parallelogram-structural spans, from stud to stud, their hinged joints deform and fail when detached from their restraining foundations in wind, flood or earthquake events.

Moreover, most prefabricated modular systems cannot be readily disassembled and moved to new locations as conditions require. This may be that often connecting mechanisms are essentially permanent (such as nails), or not easily disconnected without damage. Moreover, powered tools and/or custom crafting are still required.

SUMMARY OF THE DISCLOSURE

The above shortcomings are overcome by a modular housing system as described herein that may be easily assembled and disassembled, with simple tools. The modular housing system of this disclosure may be easily transported and is constructed so that it is resistant to many extremes of environmental conditions such as high wind, hurricanes, floods, earthquakes, and also has very good insulating properties.

In one aspect, a modular housing system includes at least one panel having a hinge configured thereupon for expanding the at least one panel to form a section (bent) of a housing unit, the at least one hinge configured to form an angle in the panel or configured to be connectable to another panel at the hinge, and the at least one panel configured to be connectable to another adjacent panel, the panels configured to be held in place by a tensioning system running through the hinge to form a housing unit or a portion thereof and the hinge, wherein the hinge is configured to receive the tensioning system axially through its length and to establish a horizontal continuous load path.

In another aspect, a modular housing system includes at least one bent having a plurality of panels configured with at least one hinge so that the plurality of panels are expandable to form a section of a housing unit and configured so that one bent mates with a second bent along their lateral sides to connect the first bent to the second bent thereby securing the bents to one another and the at least one hinge.

In another aspect, a hinge for use in a modular housing system includes a first tubular portion wherein the first tubular portion is axially extendible and at least one securing portion configured to connect a building panel to the first tubular portion. The hinge may be configured to permit a tensioning system to run therethrough.

BRIEF DESCRIPTION OF THE DRAWINGS

The accompanying drawings, which are included to provide a further understanding of the invention, are incorporated in and constitute a part of this specification, illustrate examples of the invention and, together with the detailed description, serve to explain the principles of the invention. No attempt is made to show structural details of the invention in more detail than may be necessary for a fundamental understanding of the invention and the various ways in which it may be practiced. In the drawings:

FIGS. 1A and 1B are cross-sectional views of an example of a structural bent, to provide for a gable roof configuration, and are shown in the expanded and closed positions, respectively, constructed according to principles of the invention;

FIGS. 2A and 2B are cross-sectional views of another example of a bent, to provide for a shed roof configuration, shown in the expanded and closed positions, respectively, constructed according to principles of the invention;

DETAILED DESCRIPTION OF THE INVENTION

Figure 3:
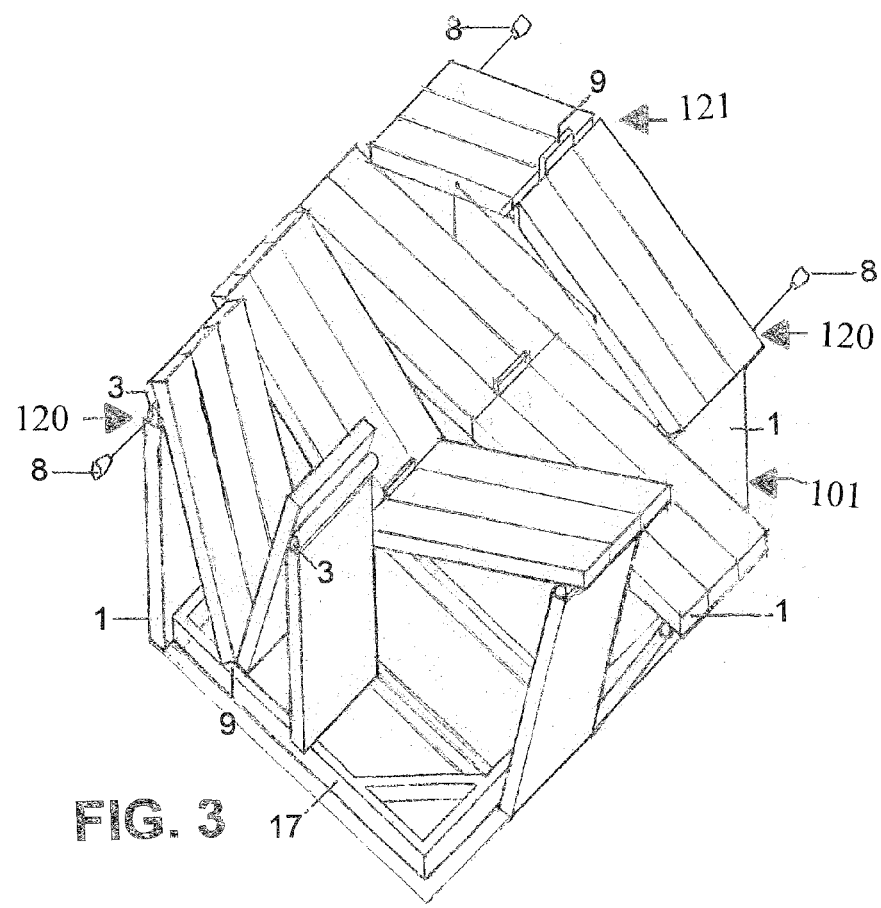
FIG. 3 is an illustration demonstrating the assembly method of several linked bents into a gable unit, and optional floor system, performed according to principles of the invention.
Figure 4:
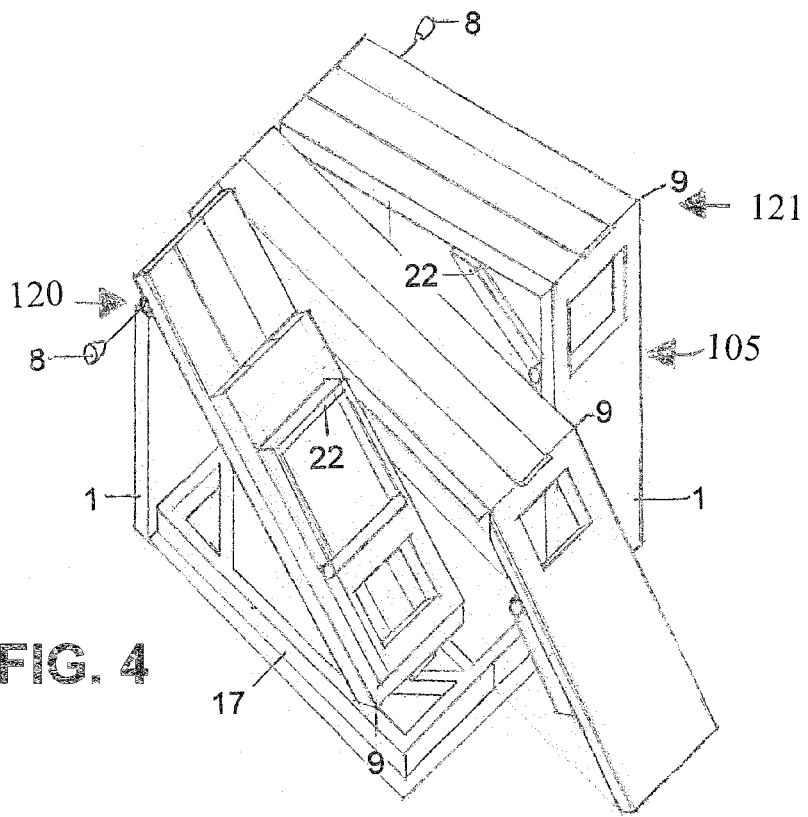
FIG. 4 is an illustration demonstrating the assembly method of several linked bents into a shed unit, and optional floor system, performed according to principles of the invention.

The various aspects of the invention and the various features and advantageous details thereof are explained more fully with reference to the non-limiting examples that are described and/or illustrated in the accompanying drawings and detailed in the following description. It should be noted that the features illustrated in the drawings are not necessarily drawn to scale, and features of one example may be employed with other examples as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the examples of the invention. Accordingly, the embodiments herein should not be construed as limiting the scope of the invention, which is defined solely by the appended claims and applicable law. Moreover, it is noted that like reference numerals represent similar parts throughout the several views of the drawings.

This housing system, also known as "Maisons Demontables" illustrated in examples throughout the Figures, and as constructed according to principles of the invention described herein, may utilize a plurality of lightweight composite construction panels 1 to create modular housing units. Referring to FIGS. 1A and 1B, the panels 1 may comprise expanded polystyrene (EPS) panels, such as produced by RADVA Corporation of Radford, Va., U.S.A., although other manufacturers also provide similar types of panels. Other types of panels that employ similar construction techniques and/or other types of insulting material are also contemplated. A bent generally refers to a plurality of panels (typically 3 or 4 or more panels) that are hinged to one another so that they can be compressed for shipping, and expanded or unfolded to be used as part of a housing unit, heretofore referred to as an "assembly", when connected to other unfolded bents. (An assembly of panels may also be known as a "chassis" and an assembly of chassis a "unit".)

Referring to FIGS. 1A and 1B, an embodiment of a basic building element, heretofore referred to as a "bent" may be attached one to another for creating a housing unit of any desired length, and by varying the length and pitch of the roof element of the bent 101, the width of the sheltered area may also be variable, according to principles of the invention. FIGS. 2A and 2B are an embodiment of a second type of bent, generally denoted by reference numeral 105. These bents 101, 105 may be constructed of multiple panels 1, with one or more hinging mechanisms to interconnect panels 1, as described more fully below.

Figures 10, 11:
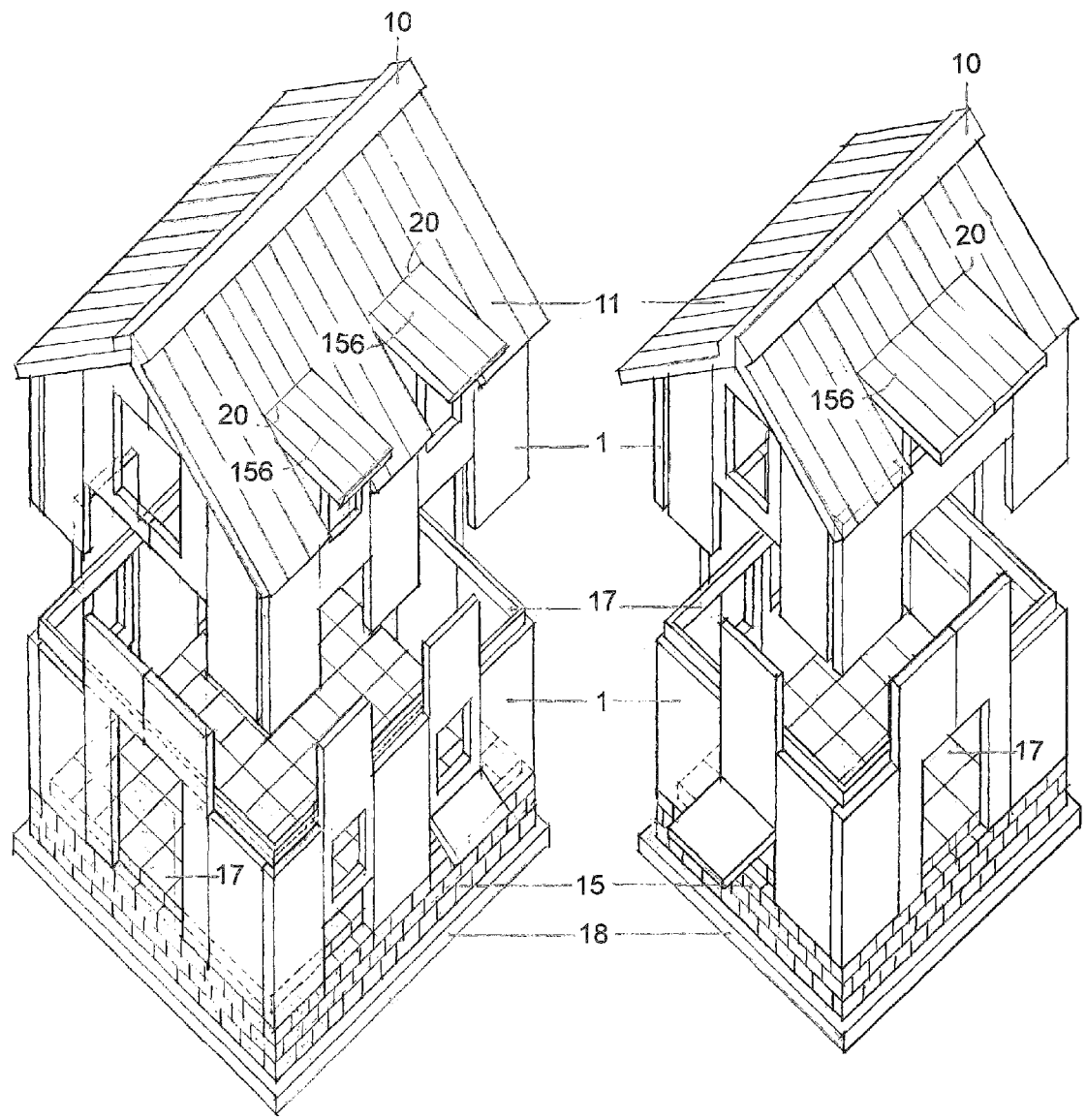
FIG. 10 is an exploded axonometric view demonstrating a conversion of an existing 12'×16' one story configuration to a two story configuration, via interlocking panels, a suspended floor system and a slip jointed panel to create upper floor dormers, configured according to principles of the invention.
FIG. 11 is an exploded axonometric view of a 16'×20' two story unit illustrating a suspended floor system, using any suitable floor system, configured according to principles of the invention.

In use, the units comprising bents 101 and/or bents 105 may then be either "Teed" perpendicular to one another or stacked above more panels, for additional floor space, both in single-story configurations (as shown for example in FIG. 9) and multi-story configurations (as shown for example in FIGS. 10-11).

The panels 1 may be constructed having high durability, high resistance to stress, and high lateral and axial loading factor specification and related characteristics. In embodiments, the panels 1 may be configured with some variations for a specific purpose, such as a roof panel may be clad to provide exterior protection. Also, the panels 1 may have quite high thermal R-value rating for thermal insulation provisioning. The panels 1 may have varying thickness, including in some embodiments a thickness of about six inches, although smaller or large thicknesses may be utilized such as four, eight or ten inches, for example. The modular system described herein may be suitable for emergency type housing systems, easily transportable to provide quick energy efficient (e.g., easily heated and/or cooled) weather resistant shelters for earthquake, flood, tsunami, or other type of catastrophe victims, for example. However, the housing systems described herein may also be suitable for other uses including, for example, military operations, hunting lodges, or even routine traditional housing, as appropriate.

As shown in reference to FIGS. 1A and 1B an unfolded (or closed) bent 101 (shown in FIG. 1B) may be expanded and erected to create a fully formed bent 101 (shown in FIG. 1A). Likewise, closed bent 105 shown in FIG. 2B may be expanded or unfolded to create a fully formed or expanded bent 105 (shown in FIG. 2A). Each bent 101, 105 may comprise a plurality of panels 1, typically, four panels for bent 101 and three panels 1 for bent 105. Alternative panel 1 positions may comprise panels 1A.

Bent 101 and bent 105 may include a ridge hinge assembly 121 that provides for angled arrangement of the adjoining panels 1. Moreover, bent 101 and bent 105 may comprise an eave hinge assembly 120 for establishing a wall and a roof section, and is described more fully below. The bent 101 and/or bent 105 may be fastened to a foundation, or similar structure, by a moment resistant joint such as securing mechanism 14.

Bent 105 may also include a brace member or collar tie 22, that can be extended in place to act as a compression brace, and may be an optional part of the bent 105. A floor system 17, which may be concrete or other material, is also shown for securing one or more bents 101, 105 to form a housing unit.

Either bent 101 or bent 105 may be configured with an optional trombe wall section for capturing heat generated from sunlight for circulating into the finished housing unit. The trombe wall includes a gap portion between an outer surface section and the inner panel 1.

Figure 8B:
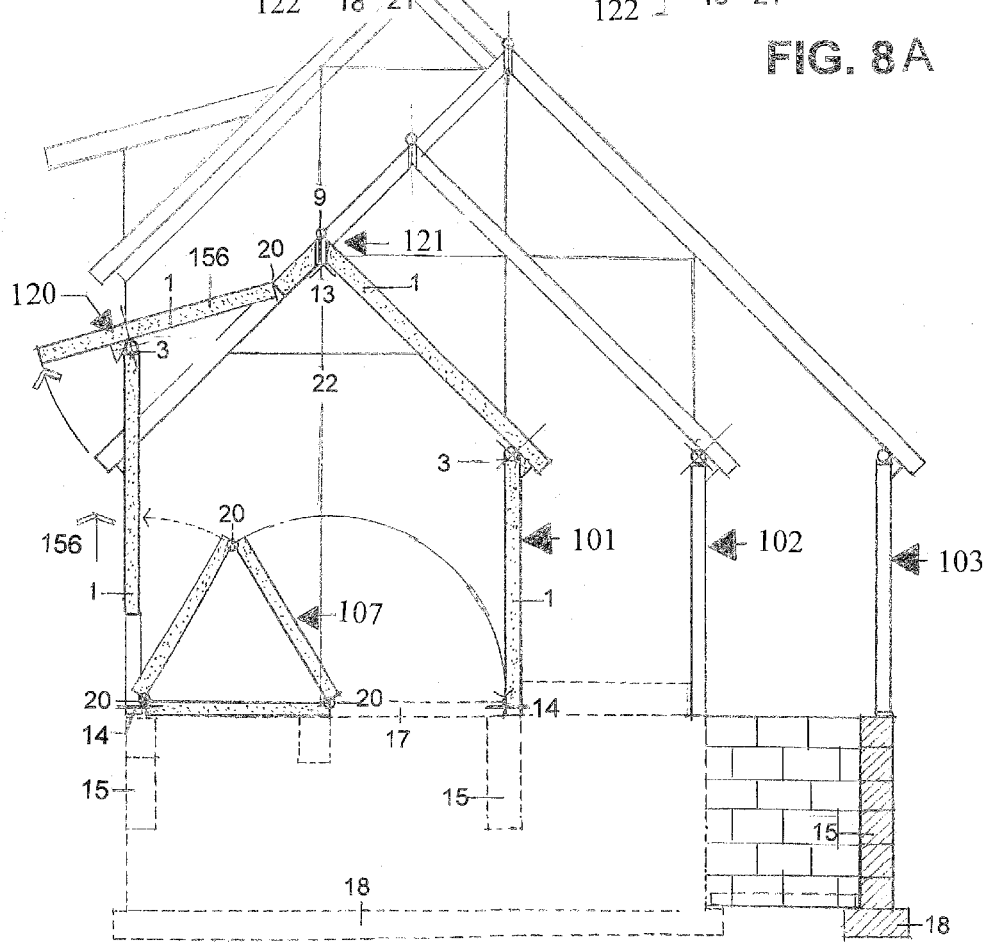
FIG. 8B is a cross section view demonstrating assembled housing bents of varying widths/spans, dormers and other subassemblies, configured according to principles of the invention.
Figure 9:
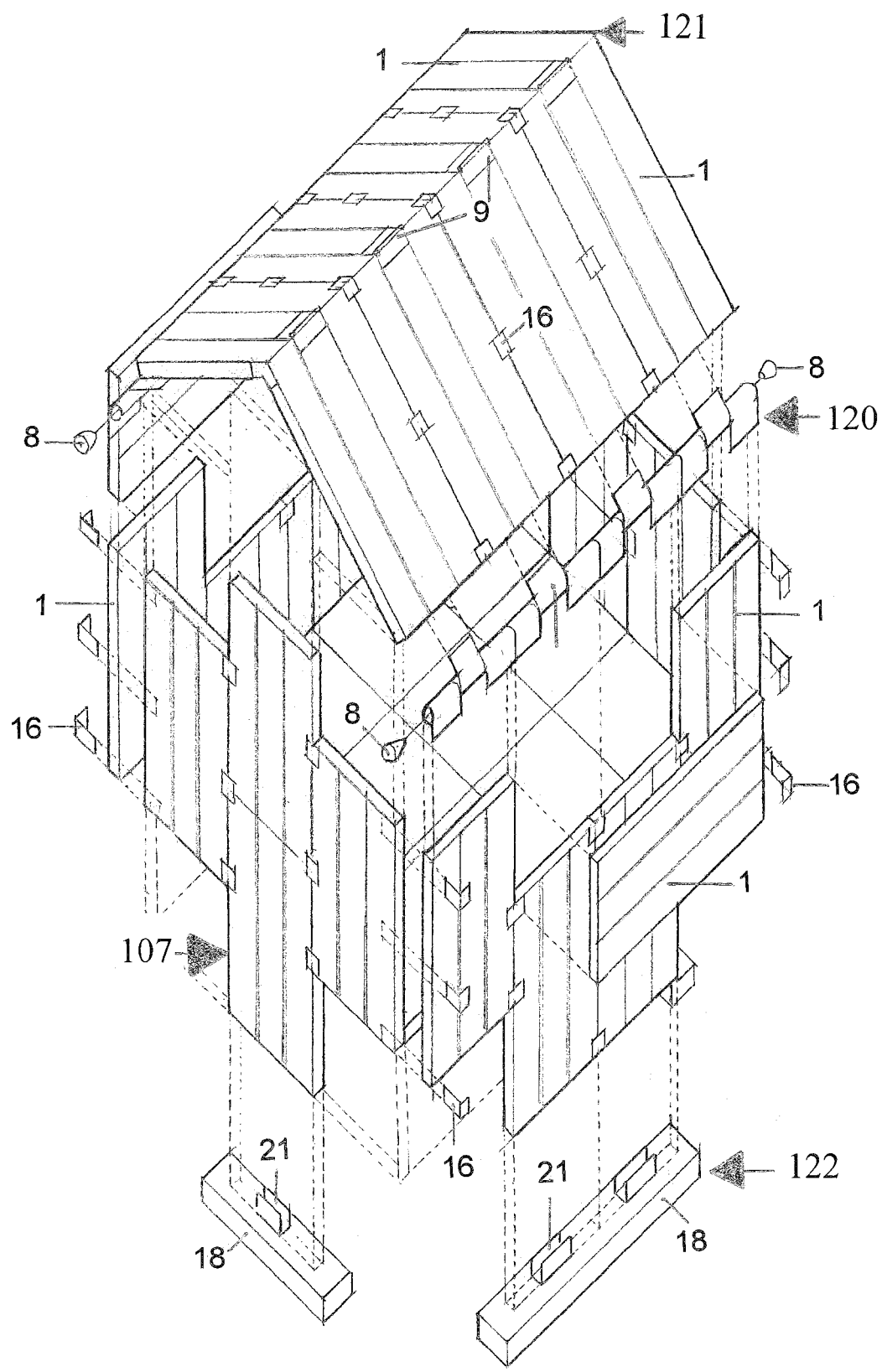
FIG. 9 is an exploded axonometric showing the combination of bents of FIG. 8B as subassemblies into larger assemblies by utilizing staggered panel joining and integral foundationing to create complete housing enclosures that may be attached to footings, constructed according to principles of the invention.

FIG. 3 shows a plurality of bents 101 being unfolded and arranged next to one another to form an extent of a housing unit. A third type of configuration (FIG. 9) may function as end walls (i.e., an end wall assembly) and may comprise panels made of the same or similar EPS composite construction panels 1 and may form the end walls 107 (as shown in FIG. 9). An entry or window passage may be formed in panel 1. These panels may be pre-assembled with a piano type hinge 20 (FIG. 8B) to connect panels together, and to permit expanding of the end walls 107 by rotating panels into an open position (as shown in FIG. 8B). These panels may be constructed of any suitable size.

Each panel 1 and/or panels may be configured to mate with an adjacent panel along respective sides by a tongue and groove technique or other and connected by tension cable 7 (FIG. 5) and restraint hub end cap 8 (FIG. 9), connecting arrangement such as snap fit, and perhaps using an attaching mechanism such as screwed or adhered plates 16, but not all panels require use of an attaching mechanism. A lightweight flooring system 17, perhaps EPS composite construction panels, may be dropped into place or otherwise placed within the housing unit.

These building systems' components, such as the bents 101, 105, and end wall 107, may be produced and detailed to be assembled and disassembled with only two tools: a screwdriver, while perhaps in some situations, a circular or hand saw may be used for custom openings and/or other cuts. In areas where electricity is not available, units may be constructed to be assembled by hand tools only. The system and method of the present disclosure may include providing one or more of:

1. a prefabricated housing system of components and assembly with a procedure so the components may be easily assembled and disassembled.
2. components that can be easily stored, for long periods, without degradation, loaded on transport, shipped and unfolded at destination by generally unskilled labor.
3. a system of construction that may not rely upon a single manufacturer for any of its components, which may permit competition for lowest cost, and general availability.
4. resistance to weather, and also resistant to earthquake, earthslide, earthfire, earthflood, and earthwind to the following standards: survive 8.0 magnitude earthquake, 200 mph winds, rising floodwaters, and interior fire to about 500 degrees F.
5. safe materials for short or long-term human habitation.

Figure 5:
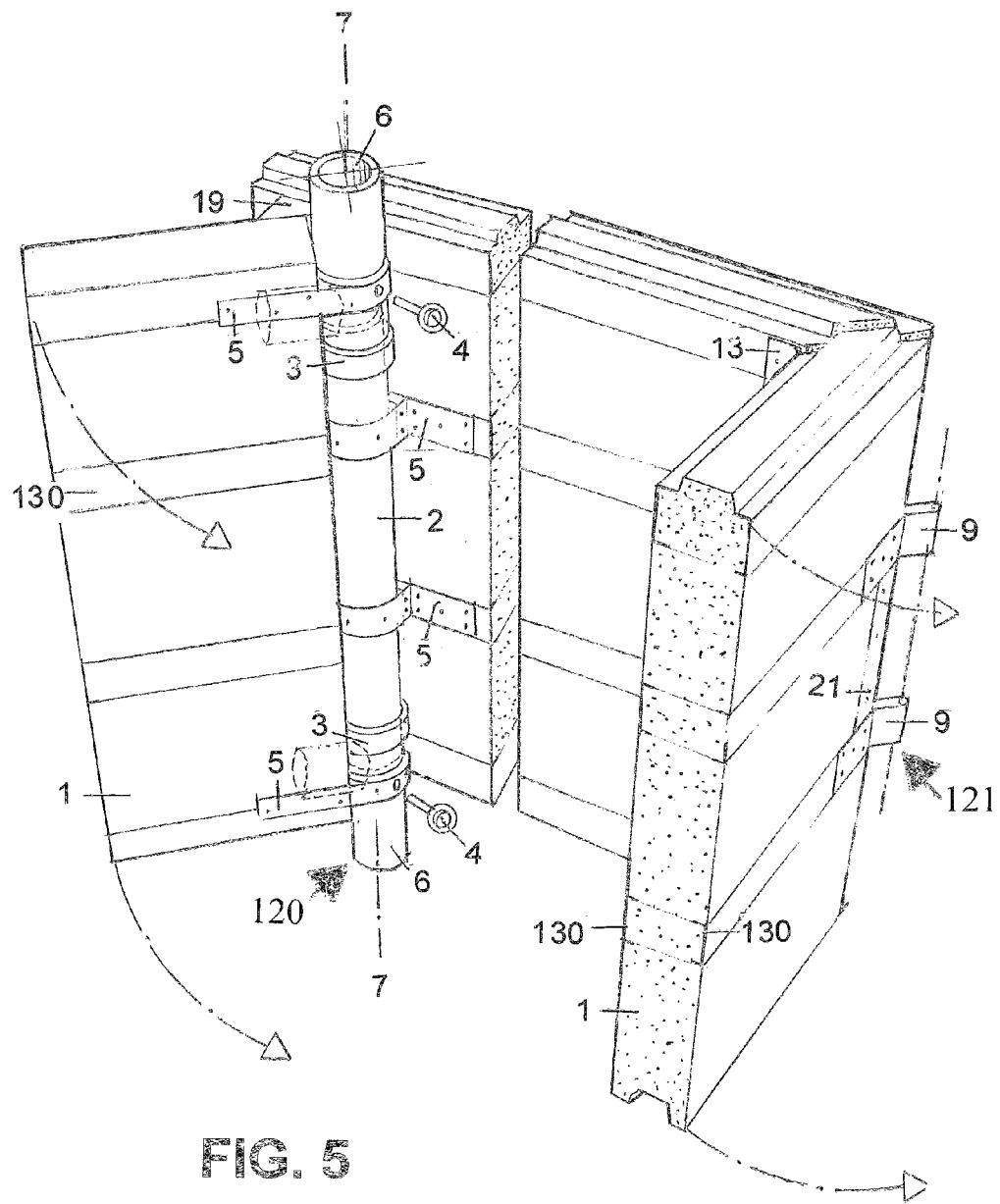
FIG. 5 is a perspective diagram that details examples of the ridge and eave hinge components and fastenings, and the pin-fixed eave hinge and its post-tensioning right-of-way, tensioned cable and post-tensioning restraints, configured according to principles of the invention.
Figure 6:
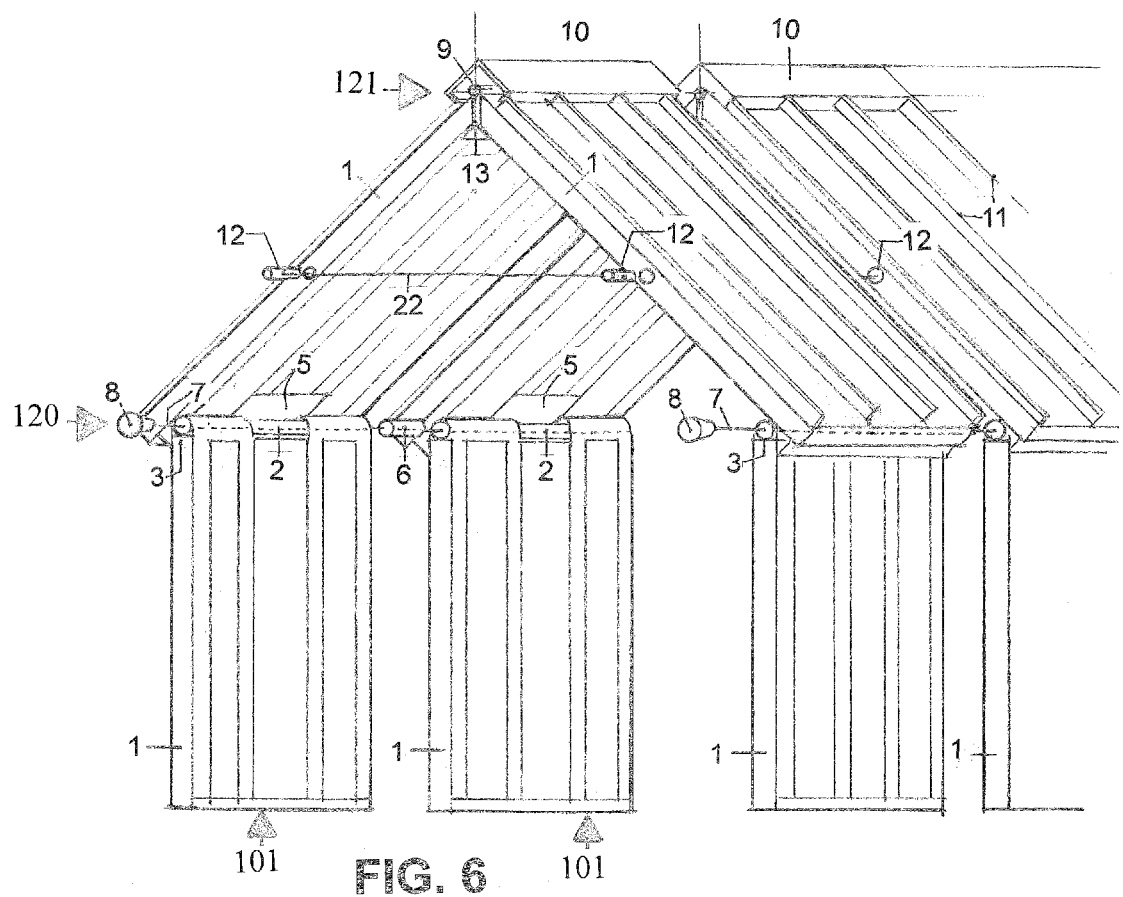
FIG. 6 is a projected elevation view representing the disposition of bents to any number and an exemplary 45 degree angled roof, and exemplary four foot spanner increments/modules, configured according to principles of the invention.

As shown, perhaps more clearly in reference to FIGS. 1A, 1B, 2A, 2B, 3 and 4, several unique hinging techniques may be utilized to permit close-packing of the housing system components into shipping containers for transport, and to permit rapid erection and demounting, as conditions require. At least three types of hinging arrangements may be provided. A first hinge mechanism, generally denoted by reference numeral 120 (as shown in FIGS. 5-7) may also utilize a pin 4 and alignment arrangement to fix the soffit in position after unfolding bent 101 or bent 105 from a shipping container.

Figure 7:
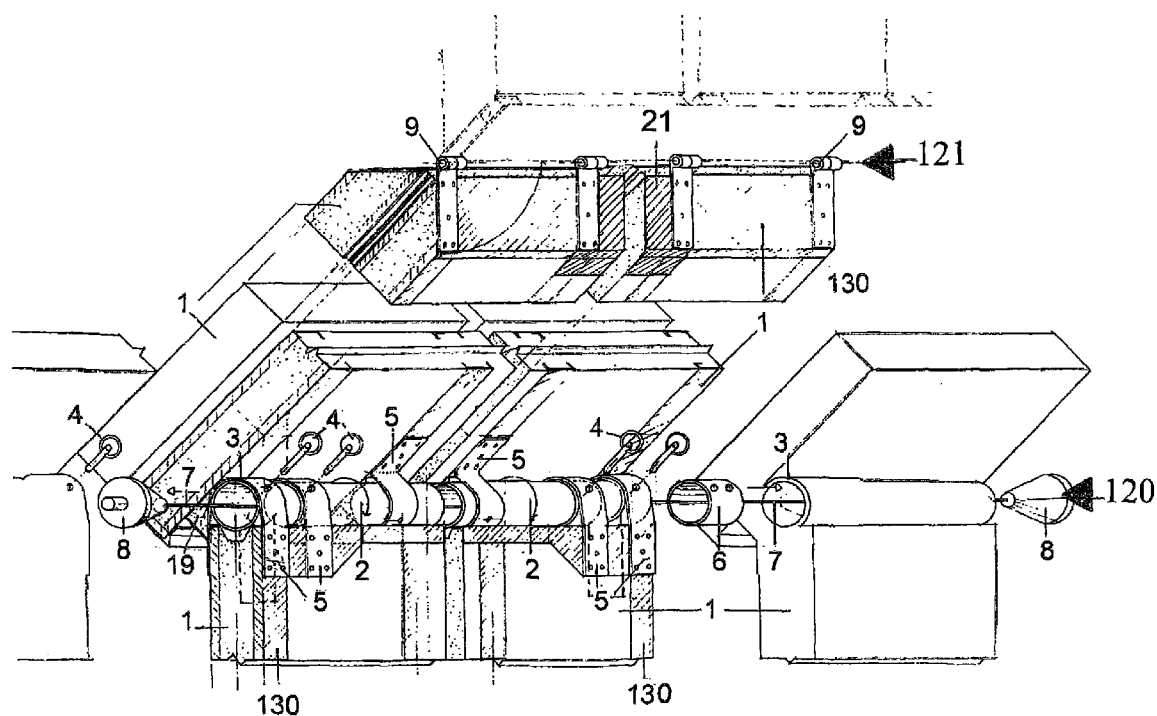
FIG. 7 illustrates the primary hinge elements and details their fittings and connections, configured according to principles of the invention.

FIG. 7 is a diagram that details primary ridge hinge elements. Included are primary eave hinge components and fastenings, with the pin-fixed eave hinge and its post-tensioning right-of-way and tensioning cable and post-tensioning restraints, configured according to principles of the invention. A first eave hinge mechanism 120 may be configured to interconnect wall panel 1 of a bent roof panel 1 of the roof portion of the bent at embedded structural supports 130 of the panels 1. The first eave hinge mechanism 120 may be constructed as part of wall panel 1 during the molding process. The first hinge 120 may be configured to rotate around a common hollow conduit member 2 that assists in interconnecting panels 1 of wall and roof. The hub 3 comprises a T-collar that connects panel 1 to the conduit member 2. Attachment mechanism such as strap 5 holds the hub 3 and conduit member 2 to panel 1 at support structure 130. Support structure 130 is an integral component of panel 1

The first hinge arrangement 120 may include a coupler 6 (or a "link") for joining two adjacent bents, by joining each conduit 2 of each bent at the two adjoining bents. The hinge arrangement 120 may be deconstructable and movable thereby permitting the mated bents to be disconnected from one another. The coupler 6 may also permit independent rotation of a bent or adjacent bents, as needed, until locked into place.

The hinge mechanism 120 may be fixed into a desired position by a locking mechanism, such as pin 4. A tensioning cable 7 (or perhaps a rod) may be utilized to place tension between two end caps 8 (end caps 8 may be employed at each end of a formed wall, see FIG. 7) for holding a plurality of bents 101 together, such as for a wall of a housing unit. A second tensioning mechanism 22 may be used to tension panels across a roof line, similar to the function of the bottom chord of trusses, at nodes 12 shown in FIG. 6. A joining mechanism such as tongue-in-groove type interconnection may be used to interconnect adjacent panels along the vertical or side edges. Fasteners such as screws or plates may be used, but usually is not necessary to hold the adjacent panels 1 together.

Referring to FIGS. 6 and 7, a ridge hinge assembly 121 may provide connectivity to a plurality of panels 1 at the ridge of a roof. The ridge hinge assembly 9 may be formed into the roof panels 1 for easy formation of an angle at a ridge, for example. A ridge cap 10 (FIG. 6) may be employed to create a weather resistant barrier at the ridge on the roof. This hinge and pinning technique may provide for alignment arrangement of one conduit 12 with another and to fix the soffit 19 in position after unfolding.

This ridge hinge mechanism 121 may also include a conduit 13 that is essentially hollow along an extent of a housing unit for forming an electrical wiring chase, thereby permitting foundations to be constructed devoid of electric raceways. Instead, according to principles of the invention, wiring may drop from this hinge mechanism 121 or eave hinge mechanism 120 to the floor or a counter top, or the like, as desired. A coupler 6 may interconnect adjacent conduit/axles 2.

In embodiments, the panels 1 for roofs or walls may be pre-clad for weather resistance. An attached solar collector, perhaps attached by adhesive to weather-resistant roof pans 11, may be connected in series to a central transformer, and optionally with power joined to off-site power sources, may provide power within the shelter. In order for exterior shells created from the bents to be free of heat-bridges that would compromise the integrity of the envelope, all walls are continuous from floor to ridge, regardless of number of floors, with doors and windows the only penetrations. All connections, to foundation, eave and ridge, are moment resistant, and contribute to the ability of the structure to flex, but not shatter, in earthquake or hurricane, and with no voids in the walls for fire to run, the resulting shelter becomes fire-resistant when clad with standard half-inch gypsum board or stucco. By utilizing an optional space-frame foundation, such configurations can be temporarily floated in flood conditions.

Figure 8A:
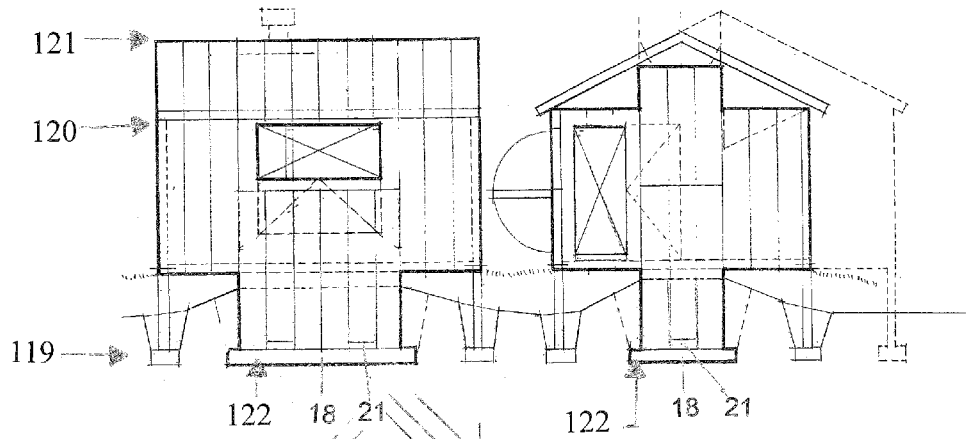
FIG. 8A illustratively demonstrates the three primary panel attachment points of base, eave and ridge, configured according to principles of the invention.

FIG. 8A illustratively shows three primary panel attachment points of base, eave and ridge. In conjunction with the panels, a Continuous Load Path ("CLP") is created from foundation footer 122 which may be below grade 119. The CLP includes hinges 120, 121 and connectors 14, 21. The CLP is important to hurricane, flood, and landslide resistance.

FIG. 8B is a cross section view demonstrating assembled housing bents of varying widths/spans, dormers and other subassemblies, configured according to principles of the invention. The modular housing may be attached at foundation 15. FIG. 8B illustrates an ability of enlarging a housing unit by additional use of panels 1, roof panel 1, and end wall 107, as seen by smaller configuration 101, expandable to medium configuration 102 to a larger configuration 103.

FIG. 9 is an axonometric view representing the end-closure assembly and width options for an exemplary 45 degree angled roof, and exemplary four foot spanner panel 1 increment/section, according to principles of the invention. Each section called out shows how a housing unit may be configured with the panels 1 and hinge mechanisms such as described herein in FIGS. 10 and 11 where a dormer 156 is shown constructed by sliding/rotating a panel of a bent at roof hinge 20. A floor system 17 is shown installed.

FIG. 9 also shows the linking of bents along the eave line according to principles of the invention. Whenever a passageway may be required from one shelter/unit to another, the primary eave hinge, (e.g., hinge shaft or conduit 2) attached to roof panel 1 only, may become a lintel without need for a modification.

FIG. 10 is an exploded axonometric view demonstrating a conversion of an existing 12'×16' one story configuration to a two story configuration, via interlocking panels, a suspended floor system and a slip jointed panel to create upper floor dormers, configured according to principles of the invention. FIG. 11 is an exploded axonometric view of a 16'×20' two story unit illustrating a suspended floor system, using any suitable floor system chosen by the builder, configured according to principles of the invention. The suspended floor system uses any suitable floor system chosen by the builder, according to principles of the invention. The suspended floor system, which may be composite construction wall panels as utilized in bents, is denoted by reference numeral 17.

The system components and method of assembling the invention may include, in various aspects, a hinged wall-roof "bent" which folds completely flat, for shipping with a minimum of air in the packaging. Also provided may be a pinned method of fixing the hinge(s) to moment-resist all natural forces without tools. Moreover, a plurality of bents may be assembled in series or stacked to form multi-story structures and connected together.

Also provided may be a method of connecting the bents to each other whose connection-components are integral to the panels typically provided by component sources. A combined hinge and electrical conduit, whose links, similar to spinal chord discs, may connect one panel to another, and accommodate a post-tensioned wire that compress the links and stiffens the structure, may be provided. Further, a series of collar ties 22, consisting of post tensioned cables and restrainers linking panel to panel may be provided. In another aspect, a pinned connection to the foundation 18, to insure a full continuity of wall from foundation to eave-hinge may be provided. In one aspect, essentially no wall penetrations or other thermal breaks other than doors and windows may be present in a final housing unit. In some embodiments, integrated solar panels for supplemental electrical power to the central power grid or sale of excess electricity to the power grid may be provided. Also, a composite structural chassis resulting from the assembly of basis bents, that is moment resistant at all joints and with all joints interconnected by a steel straps 16 establishing a continuous-load-path (CLP) which connects to the foundation type selected, resisting up-force, side-force and down-force essentially equally.

In still other aspects, the assembly of certain components to one another, as described herein, may be aligned vertically, and staggered horizontally, negating any continuous joints horizontally. Vertical joints may be hollow to accommodate vertical electrical wiring, and may slide so that dormer windows may be created by simply slide-lifting alternate wall panels and hinging roof sections to create dormer roofs. In another aspect, one story units may be expandable to two stories by dovetailing lower floor panels with initial bents, and hanging a second floor inside the foam and steel envelope at the desired heights. In another aspect, in lieu of a fixed foundation, wall, roof and floor panels may be attached to a mobile frame on wheels for movement from position to position on site. Further, exterior and interior surfaces may be left unclad for an indefinite period without degradation of the structure.

A continuous load path (CLP) may be created by the various components herein, specifically including hinges 120, 121, 122 (in applicable configurations) connected by straps 16 and/or 5 which may be integral (or connectable) to the panels 1. This configuration assures that roof, wall and/or floor separation is greatly minimized (or eliminated) due to unexpected stresses such as earthquakes, wind, flood, etc. The hinges 120, 121, 122 provide expandability and collapsibility to facilitate portability of bents.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention. U.S. Pat. No. 6,350,308 and U.S. Patent Publication No. 2010/0154331 are incorporated herein by reference in their entirety. If any conflicts exist between this disclosure and the priority applications, this disclosure governs.

I claim:

1. A modular housing system, comprising:
at least one panel having an eave hinge configured thereupon for expanding the at least one panel to form a bent of a housing unit, the eave hinge comprising a plurality of conduit sections including a first section and a second section, a coupler connecting the plurality of conduit sections, a first attachment mechanism and a second attachment mechanism spaced apart from the first-attachment mechanism, wherein the first attachment mechanism connects the first section of conduit sections to only the at least one panel and the second attachment mechanism only connects the first section of the conduit sections to another panel, the eave hinge permitting selection of an angle in the bent and the at least one panel configured to be connectable to another adjacent panel with the coupler therebetween, the panels held in place by a tensioning system running through the eave hinge to form a housing unit or a portion thereof; and
wherein the eave hinge receives the tensioning system axially through its length.

2. The modular housing system of claim 1, wherein the eave hinge permits the at least one panel to expand from a closed position to form an elongated panel or at least two portions connected by the eave hinge.

3. The modular housing system of claim 1, wherein the eave hinge forms a wire chases.

4. The modular housing system of claim 1, further comprising the tensioning system.

5. The modular housing system of claim 1, further comprising at least three hinges in any one bent and at least two linkages securing the any one bent to a foundation or immovable base to create a continuous load path (CLP).

6. The modular housing system of claim 1, wherein the at least one panel comprises two panels and is configured to be unfolded vertically about the pin fixable eave hinge and configured to be secured at the selectable angle to provide both part of a wall and part of a roof.

7. The modular housing system of claim 1, wherein the pin fixable eave hinge comprises at least two hubs, and the eave hinge is rotatable and fixed at a selected position by a locking mechanism.

8. The modular housing system of claim 1, wherein the at least one panel comprises at least two spaced apart structural support members with expandable polystyrene configured therebetween and wherein the eave hinge is attached to the at least two spaced apart structural support members.

9. The modular housing system of claim 1, wherein the tensioning system comprises a cable.

10. The modular housing system of claim 1, wherein the first attachment mechanism is a different shape from the second attachment mechanism.

11. The modular housing system of claim 1, wherein the first attachment mechanism connects to the at least one panel on both sides of the at least one panel, and the second attachment mechanism connects to only one side of the another panel.

12. The modular housing system of claim 1, wherein the coupler is located at the junction of the at least one panel and the another adjacent panel.

13. The modular housing system of claim 1, wherein the at least one panel is a plurality of panels forming a first bent and a second bent, the first bent being connected to the second bent at a ridge hinge, the first bent and the second bent each having the eave hinge comprising a plurality of conduit sections, each eave hinge fixed at a selected angle for each bent, each of the plurality of panels comprise expanded polystyrene and embedded structural members forming a composite construction, and when installed a continuous load path is created from a foundation through each eave hinge fixed at the selected angle for each bent and the ridge hinge, contributing to an ability of the modular housing system to flex without shattering for resisting a hurricane, a flood or a landslide, and each eave hinge is configured with the tensioning mechanism passing therethrough between adjacent bents to establish a horizontal continuous-load-path (CLP).

14. A modular housing system, comprising:
a plurality of bents including a first bent and a second bent, each bent having a plurality of panels comprising expanded polystyrene, each bent configured with at least one eave hinge so that the plurality of panels are vertically expandable to form a section of a housing unit and configured so that the first bent mates with the second bent along their lateral sides using a tongue and groove technique to connect the first bent to the second bent thereby securing the bents to one another to form a wall;
a coupler coupling the at least one eave hinge of the first bent to the at least one eave hinge of the second bent, wherein the coupler and each eave hinge comprise a conduit; and
a tensioning system arranged through the at least one eave hinge of the first bent, the at least one eave hinge of the second bent and the coupler to tension the connected bents at each end of the formed wall.

15. The modular housing system of claim 14, wherein the panels comprise at least in part expandable polystyrene.

16. The modular housing system of claim 14, wherein the at least one eave hinge includes a tensioning mechanism passing therethrough from the first bent to the second bent creating a horizontal continuous-load-path (CLP).

17. The modular housing system of claim 14, wherein the at least one eave hinge is constructed as an integral part of at least one of the panels.

18. The modular housing system of claim 14, wherein the at least one bent is configured to be expanded to form at least one of: a part of a wall, a part of a roof and a part of a floor.

19. The modular housing system of claim 14, further comprising a ridge cap configured to cover a ridge formed by the expanded at least one bent.

20. The modular housing system of claim 14, wherein at least one of the bents comprises an end wall bent.

21. The modular housing system of claim 14, wherein the at least one eave hinge is deconstructable and moveable thereby permitting the mated bents to be disconnected from one another.

22. The modular housing system of claim 14, wherein the at least one bent is configured to be unfoldable vertically about the eave hinge to provide both part of a wall and part of a roof.

23. The modular housing system of claim 22, wherein the eave hinge further comprises at least two hubs.

24. The modular housing system of claim 23, wherein the eave hinge is rotatable and fixed at a pre-determined position by a pin inserted through one of the at least two hubs.

25. The modular housing system of claim 14, wherein the plurality of panels each comprise at least two spaced apart metal structural support members with expandable polystyrene configured therebetween and wherein the eave hinge is attached by U-shaped straps to the at least two spaced apart metal structural support members that create vertical support columns.

26. The modular housing system of claim 14, wherein the tensioning system comprises a cable configured to tension the section of a housing unit by placing tension at opposite ends of the housing unit formed by the mated bents to hold the mated bents together.

27. The modular housing system of claim 26, wherein the eave hinge comprises at least two hubs and the conduit, wherein the eave hinge is rotatable and fixed at a selectable position by a pin inserted through one of the at least two hubs into the conduit.

28. The modular housing system of claim 27, further comprising a second tensioning system to connect two opposing and spaced part bents forming a roof.

29. The modular housing system of claim 14, wherein the eave hinge creates part of a continuous load path of the bent.

30. The modular housing system of claim 7, wherein the locking mechanism comprises a pin inserted through one of the at least two hubs into the at least one conduit sections.

31. The modular housing system of claim 14, wherein the plurality of bents includes a third bent, the first bent being connected to the third bent at a ridge hinge, the first bent and the third bent each having at least one eave hinge comprising a conduit, each eave hinge fixed at a selected angle for each respective bent, each of the plurality of bents comprise the expanded polystyrene and embedded structural members forming a composite construction, and when installed a continuous load path is created from a foundation through each eave hinge fixed at the selected angle for each bent and the ridge hinge contributing to an ability of the modular housing system to flex without shattering for resisting a hurricane, a flood or a landslide.

* * * * *